Oct. 30, 1928.
W. S. H. HAMILTON
1,689,483
STORAGE BATTERY CHARGING SYSTEM
Filed Feb. 25, 1925
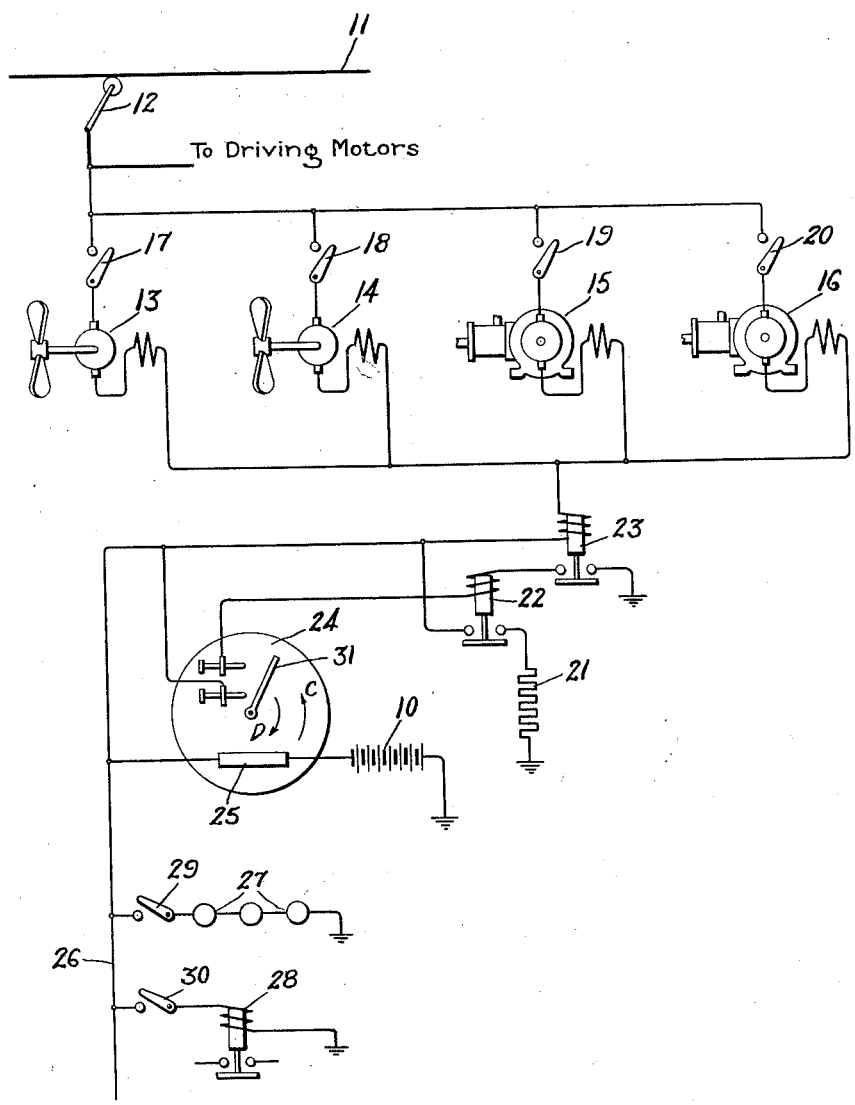
Inventor:
William S.H. Hamilton;
by
His Attorney.

Patented Oct. 30, 1928.

1,689,483

UNITED STATES PATENT OFFICE.

WILLIAM S. H. HAMILTON, OF SCHENECTADY, NEW YORK, ASSIGNOR TO GENERAL ELECTRIC COMPANY, A CORPORATION OF NEW YORK.

STORAGE-BATTERY-CHARGING SYSTEM.

Application filed February 25, 1925. Serial No. 11,552.

This invention relates to charging systems for electric storage batteries, and more particularly to automatic systems for controlling the charging current of the battery, and has for its object the provision of simple and reliable means for automatically maintaining the battery in a desired charged condition.

More specifically, the invention provides a novel arrangement of control apparatus and circuits whereby the charging current of an electric storage battery is automatically controlled responsively to the value of the current in the charging circuit, as well as the condition of charge of the battery.

Although of general application, the present invention may be applied advantageously to control the charging of a storage battery employed as a low voltage source of power for the lighting and control circuits on electric cars or locomotives used in high voltage direct current traction service. Heretofore charging systems have been proposed for maintaining the storage battery employed in such service in a desired charged condition by connecting the battery in series circuit with certain electric translating devices employed on the electric cars or locomotive such, for example, as the air compressor motors or the blower motors in order to permit charging of the battery from the high voltage source. However, in such systems heretofore proposed with which I am familiar, charging of the battery is dependent directly upon the duty of the electric translating devices connected in circuit with the battery for controlling the charging current thereof. Thus under heavy duty conditions the battery may be charged at an excessively high rate while under light duty conditions the charging current may be below the desired charging value. Although under routine operating conditions where the load on the battery is fairly constant and the average duty of the auxiliary devices corresponds to the required charging rate of the battery, such a battery charging system may be satisfactory, it obviously leaves much to be desired when the electric car or locomotive is employed in service where the duty of the translating devices, as well as the load on the battery, varies between wide limits.

The present invention provides a battery charging control system whereby the charging of the storage battery is controlled automatically in response to both the value of the charging current supplied to the battery and the condition of charge of the battery. In carrying the invention into effect in the preferred form, a by-pass circuit comprising preferably a current limiting resistor is arranged to be connected in shunt circuit with the battery under the control of automatic means responsive to the current in the charging circuit of the battery and the state of charge of the battery in order to by-pass a portion of the charging current supplied to the battery if the current in the charging circuit exceeds a predetermined safe value when the battery is in a fully charged condition. The arrangement is such that when the charging current supplied to the battery is below the predetermined value the by-pass circuit is maintained open even though the battery is in the fully charged condition. In this way it is insured that the battery is maintained in a desired charged condition without danger of overheating or damaging the battery plates even though the electric car or locomotive with which the battery is associated is employed in service wherein the load on the battery as well as the charging current supplied to the battery varies between wide limits.

For a better understanding of my invention reference is had to the following description taken in connection with the accompanying drawing in which the single figure diagrammatcially illustrates the invention applied to control the charging of an electric storage battery employed on an electric locomotive in order to explain the principles of the invention.

The novel features and combinations which I believe to be characteristic of my invention are pointed out with particularity in the appended claims.

Referring to the drawing it will be seen that the electric storage battery 10 is arranged to be supplied with charging current through a circuit extended from the high voltage trolley line 11 through a suitable current collecting device 12 carried by the electric car or locomotive and thence through any selected portion of the electric translating devices 13, 14, 15 and 16 and the battery 10 to ground. The translating devices 13 and 14 as illustrated represent the ordinary form of direct current motor driven blower usually employed on high power electric locomotives for cooling the driving motors. The electric translating devices 15 and 16 as shown represent the usual form of motor driven air compressors which are ordinarily employed on electric cars or locomotives having air brakes. It will be observed that suitable switches 17, 18, 19 and 20 are provided for closing the energizing circuit of the motor driven devices 13, 14, 15, 16 as the service demands operation of the respective auxiliary devices. Although not shown in the drawing it will be understood that in accordance with the usual practice the air compressor switches 19 and 20 preferably are arranged to be actuated automatically by suitable mechanism responsive to the pressure in the air reservoir supplied by the motor driven compressors 15 and 16.

In order to control the charging current of storage battery 10 in accordance with my invention, a by-pass circuit around the storage battery 10 including in the preferred form illustrated, the current limiting resistor 21 is arranged to be controlled by the electromagnetic switch 22. The energizing circuit of the operating winding of electromagnetic switch 22 is under the joint control of a current responsive relay 23 and an automatic circuit controlling device 24 which is arranged to be actuated responsively to the condition of charge of battery 10. In the particular form illustrated the automatic device 24 is a circuit controlling ampere hour meter of the usual form having an operating winding 25 connected in the charging circuit of the storage battery 10, although it will be understood that other suitable forms of automatic circuit controlling devices such, for example, as circuit control hydrometers or voltmeters or the like may be arranged to be actuated responsively to the condition of charge of the battery 10 and employed in my improved charging system if desired.

Relay 23 is connected to be energized responsively to the current in the charging circuit of battery 10 and is designed so that it remains in the open circuit position in which it is shown when the current in the charging circuit is below a predetermined value which corresponds to the value of current which may be safely passed through battery 10 indefinitely even though the battery is in a fully charged condition. Should the current in the charging circuit of battery 10 exceed the predetermined safe value the relay 23 is designed to operate to the circuit closing position in order to control the charging current of battery 10 in a manner which will be more fully set forth hereinafter in the description of the operation of my invention.

It will be seen that the storage battery 10 is connected to supply current to the low voltage supply line 26 from which the lighting circuits of the electric locomotive diagrammatically illustrated as 27 as well as the control circuits of the locomotive 28 are arranged to be energized upon closure of suitable control switches 29 and 30. It should be noted that the storage battery 10 serves not only to supply current at low voltage to the circuits 27 and 28, but also to maintain the low voltage supply line 26 at a predetermined voltage above ground potential. This latter function is of great practical importance in view of the fact that if the storage battery 10 should be disconnected from the low voltage supply line 26 it is possible that the high voltage of the trolley line 11 may become impressed upon the low voltage supply line 26 and result in serious damage or accident. With my improved system of charging the storage battery 10, the battery is permanently connected to the low voltage supply line 26 at all times whether the battery is being charged or discharged.

With the high voltage supply line 11 energizing from a suitable source to supply power to the driving motors of the electric locomotive through the connection indicated in the drawing, the automatic control of the charging current of battery 10 is effected in the following manner. Assuming that the service conditions of the electric locomotive require switch 17 to be closed to place the corresponding motor driven blower 13 into operation, and that the switch 30 is closed to supply low voltage energizing current for the control mechanism of the locomotive it will be evident that the current supplied from the supply line 11 through the traveling contact device 12 to the driving motor of blower 13 will pass through the operating winding of electro-responsive relay 23 and thence through either the switch 30 and control switch mechanism 28 to ground or through the operating winding 25 of the ampere hour meter 24 and the storage battery 10 to ground. Since the movable contact 31 of ampere hour meter 24 is shown in the open circuit position it will be understood that the storage battery 10 is below the desired state of charge. Under these operating conditions the current required for the control apparatus 28 will be less than the current passing through blower 13. Hence the battery 10 will receive a charging current of suitable value and the movable circuit controlling contact 31 of ampere hour meter 24 will be moved towards the circuit closing position at a rate depending upon the rate of charge of battery 10. Should the assumed conditions continue for the interval of time required for ampere hour meter 24 to close its contact 31 the battery 10 will be charged to the desired condition and a safe nominal value of charging current will continue to flow through the battery in order to overcharge the latter.

If the service condition under which the locomotive is operated becomes such that the switches 19 and 20 are closed automatically in response to low air pressure to start operation of the compressors 15 and 17, the value of the current supplied to the charging circuit of battery 10 will be greatly increased. With the battery in the desired charged condition the increased flow of charging current through the battery may be sufficient to cause overheating or sulphation of the battery due to excessive overcharge. This undesirable result, however, is prevented in accordance with the present invention by operation of relay 23 responsively to the increased value of current in the charging circuit in the following manner. With the circuit controlling contact 31 of ampere hour meter 24 in the circuit closing position, the closure of relay 23 establishes an energizing circuit for the electromagnetic switch 22 extending from the low voltage supply line 26 through the contact 31 of ampere hour meter 24, the operating winding of switch 22 and the contacts of relay 23 to ground. Thereupon electromagnetic switch 22 is operated from the open position in which it is shown to the closed position, thereby closing the by-pass circuit for battery 10 including the current limiting resistor 21. This by-pass circuit serves to shunt a portion of the current supplied to the charging circuit through the electric translating devices 13, 15 and 16 around the battery 10 and thereby prevents overcharge of the battery to an undesirable extent. It will be understood that the value of the current shunted around the battery is limited by the resistor 21 to a suitable value which is dependent upon the relative charging capacity of the battery 10, and the current rating of the respective translating devices 13, 15 and 16. Preferably the ohmic value of resistor 21 is such that the charging current will be within the safe charging rate of the battery 10 when all of the translating devices 13, 14, 15 and 16 are operating and the by-pass circuit is closed.

When the operation of compressors 15 and 16 increases the air pressure sufficient to effect the automatic opening of switches 19 and 20 in the well known manner it will be evident that the value of the current supplied to the charging circuit of battery 10 will be decreased below the safe charging value. Under these conditions the decreased energization of relay 23 permits the latter to open its contacts and thereby deenergize the electromagnetic switch 22. Thereupon switch 22 returns to the open position in accordance with its bias to open the by-pass circuit through the current limiting resistor 21. The charging current supplied to the battery 10 by the driving motor of blower 13 continues to overcharge the battery at a safe rate.

If the operating conditions of the electric locomotive should require closure of switch 18 to set the blower 14 into operation, the current supplied to the charging circuit of battery 10 again will be increased to a value which may cause overheating or sulphation of the battery when the latter is in the fully charged condition. With the increased flow of current through the operating winding of relay 23 due to the operation of the additional blower 14 the relay 23 will be sufficiently energized to close its contacts and again establish an energizing circuit for the electromagnetic switch 22. The latter at once operates to close the by-pass circuit through resistor 21, thereby shunting sufficient current from the battery to prevent undesirable overheating or sulphation.

If now the switch 29 should be closed to energize the lighting circuits of the electric locomotive, the combined load presented by the illuminating devices 27 and the control apparatus 28 may be sufficient to require the battery 10 to discharge and thereby supply current to the low voltage supply line 26. Should the lighting load continue until the battery 10 has become discharged to a certain condition, the ampere hour meter 24 will operate to move the circuit control contact 31 out of engagement with the stationary contacts cooperating therewith. This interrupts the energizing circuit of electromagnetic switch 22 and the latter at once responds to open the by-pass circuit through resistor 21. In this way the current of the blower motors 13 and 14 previously shunted through the by-pass circuit is diverted to the supply line 26 and serves to supply the lighting and control load, as well as to recharge the battery 10. Under these conditions the value of the charging current of the battery will depend upon the value of the load upon the low voltage supply line 26. When the charging current supplied to battery 10 has continued for a sufficient interval to fully recharge the battery, the contact 31 of ampere hour meter 24 will be returned to the circuit closing position. Thereupon the electromagnetic switch 22 is again energized to close the by-pass circuit through resistor 21. It will be evident that the by-pass circuit will be maintained closed so long as the battery 10 is in the fully charged condition and the current supplied to the charging circuit of battery 10 exceeds the predetermined value at which the contact of relay 23 is closed. Thus with the low voltage supply line 26 supplying a relatively large lighting and control load and with each of the motor driven blowers 13 and 14 in operation, the ampere hour meter 24 will operate to close the by-pass circuit when the battery is fully charged to permit the battery 10 to discharge and after the battery is discharged a predetermined amount will operate to open the by-pass circuit and thereby permit the battery to be recharged.

If the motor driven air compressors 15 and 16 are set into operation when the contact 31 of ampere hour meter 24 is in the circuit opening position, it will be evident that a relatively large value of current will be supplied to the low voltage supply line 26 and that a correspondingly large value of charging current will flow through battery 10. However, this condition will continue only until the battery 10 is fully charged and the ampere hour meter 24 has operated the contact 31 to the closed position. Thereupon the electromagnetic switch 22 is energized to again close the by-pass circuit through resistor 21 and thereby shunt the desired portion of the current in the charging circuit around battery 10.

From the foregoing it will be evident that although my improved battery charging system permits the battery 10 to be charged at a relatively high rate when the battery is below the fully charged condition, nevertheless the control system effectively prevents an excessively large current from passing through the battery 10 when the latter is in the fully charged condition.

In accordance with the provision of the patent statutes, I have described the principle of operation of my invention, together with the apparatus which I now consider to represent the best embodiment thereof, but I would have it understood that the apparatus shown is only illustrative and that the invention may be carried out by other means.

What I claim as new and desire to secure by Letters Patent of the United States, is,—

1. A charging system for an electric storage battery comprising a variable current charging circuit for the battery, automatic means responsive to the current in the said charging circuit, independently operable automatic means responsive to the condition of charge of the battery, and means jointly controlled by said automatic means for decreasing the charging current of the battery only when both the current in the charging circuit exceeds a predetermined value and the battery is charged to a predetermined condition.

2. A charging system for an electric storage battery comprising a variable current charging circuit for the battery, a by-pass circuit for the battery, automatic means responsive to the value of the current in the said charging circuit, independently operable means responsive to the condition of charge of the battery, and switch mechanism jointly controlled by said automatic means for closing said by-pass circuit to shunt current around the battery only when both the battery is charged to a predetermined condition and the current in the charging circuit exceeds a predetermined value.

3. A charging system for an electric storage battery comprising a variable current charging circuit for the battery, a normally open by-pass circuit for the battery, electroresponsive circuit controlling means connected to be operated responsively to the current in the charging circuit, automatic circuit controlling means arranged to be actuated responsively to a predetermined condition of the charge of the battery, and electrically operated switch mechanism having an energizing circuit connected to be jointly controlled by said electroresponsive means and said automatic means to effect operation of said switch mechanism to close said by-pass circuit to shunt current around the battery only when both the battery is charged to said predetermined condition and the current in the charging circuit exceeds a predetermined value.

4. In a charging system for an electric storage battery, the combination of a substantially constant potential source, a variable duty electrical translating device connected to be energized in series relation with the battery from said source for supplying a current of a value corresponding to the duty of the said translating device for charging the battery, a by-pass resistor for the battery, automatic electroresponsive means responsive to the value of the current in the charging circuit of the battery, independently operable electroresponsive means responsive to the condition of charge of the battery, and switch mechanism arranged to be controlled by said automatic means for connecting the said by-pass resistor in shunt circuit with the battery only when both the current in the charging circuit exceeds a predetermined value and the battery is charged to a predetermined condition.

5. In a charging system for an electric storage battery, the combination of means for supplying a current of variable value for charging the battery, automatic electroresponsive means responsive to the value of the current supplied by said first means, independently operable automatic means responsive to the condition of charge of the battery, and means jointly controlled by said automatic means for varying the charging current of the battery independently of said first means only when both the current supplied to the battery exceeds a predetermined value and the battery is charged to a predetermined condition.

6. A charging system for an electric storage battery comprising a substantially constant potential source, a variable duty electrical translating device connected to be energized in series relation with the battery from said source for supplying a current of variable value for charging the battery, and automatic means separately responsive to the value of the current supplied by said first means and the condition of charge of the battery for decreasing the charging current of the battery only when both the current supplied by said first means exceeds a predetermined value and the battery is charged to a predetermined condition, said automatic means being arranged to increase the charging current of the battery when either the current supplied by said first means decreases below said predetermined value or the charge of the battery decreases below said predetermined condition.

7. A charging system for an electric storage battery including a variable duty electric motor for regulating the charging current in accordance with the duty of the motor comprising a charging circuit for the battery, a normally open by-pass circuit for the battery, and automatic means separately responsive to the valve of the current in the said charging circuit and the condition of charge of the battery for closing said by-pass circuit to shunt current around the battery only when the battery is charged to a predetermined condition and the current in the charging circuit exceeds a predetermined value, said automatic means being arranged to open said by-pass circuit when either the current in the charging circuit decreases below the predetermined value or the charge of the battery decreases below said predetermined condition.

8. A charging system for an electric storage battery comprising a charging circuit for the battery, a variable duty electric motor connected in series relation with the battery in said charging circuit and operable to vary the current in the said circuit in accordance with the duty of the motor, a by-pass circuit for shunting current around the battery, an electro-magnetic switch for controlling said by-pass circuit, an electroresponsive relay connected to be energized responsively to the current in the charging circuit, an automatic circuit controlling device arranged to be actuated responsively to the condition of charge of the battery, and connections whereby the said relay and said device jointly control the energization of said electromagnetic switch to effect the closure of said by-pass circuit only when both the current in the charging circuit exceeds a predetermined value and the battery is charged to a predetermined condition and to open the said by-pass circuit when either the current in the charging circuit decreases below said predetermined value or the charge of the battery decreases below said predetermined condition.

9. A charging system for an electric storage battery comprising a charging circuit for the battery including a variable duty electric translating device normally connected in series circuit with the battery and arranged to vary the value of the charging current supplied to the battery in accordance with the duty of the electric translating device, automatic means arranged to be separately actuated responsively to both the current in said series circuit and the state of charge of the battery, and means controlled by said automatic means for controlling the charging current of the battery independently of said electric translating device.

10. A charging system for an electric storage battery comprising a charging circuit for the battery including a plurality of electric translating devices, each arranged to be connected in series circuit with the battery to supply a charging current of variable value thereto, an electroresponsive relay connected to be energized responsively to the value of the current supplied to the battery, a circuit controlling ampere hour meter connected to be operated to the circuit closing position when the battery is charged to a predetermined condition and to be operated to a circuit opening position, when the charge of the battery is reduced below said predetermined condition, a by-pass resistor for shunting current around the battery, an electromagnetic switch for controlling said resistor and connections jointly controlled by said relay and said ampere hour meter for controlling the energization of said electromagnetic switch to connect said resistor in shunt with the battery when the current supplied thereto exceeds a predetermined value after the battery is charged to a predetermined condition and to disconnect said resistor when either the current supplied to the battery decreases below said predetermined value or the charge of the battery decreases below predetermined condition.

In witness whereof, I have hereunto set my hand this 24th day of February, 1925.

WILLIAM S. H. HAMILTON.